United States Patent [19]
Lardy et al.

[11] Patent Number: 5,624,348
[45] Date of Patent: Apr. 29, 1997

[54] PROCESS FOR DETERMINING THE SHIFTING TIME FOR A TRANSMISSION RATIO CHANGE IN AN INFINITELY VARIABLE TRANSMISSION

[75] Inventors: Patric Lardy, Weil der Stadt; Joseph Petersmann, Wimsheim, both of Germany

[73] Assignee: Dr. Ing. h.c.F. Porsche AG, Germany

[21] Appl. No.: 561,309

[22] Filed: Nov. 21, 1995

[30] Foreign Application Priority Data

Nov. 24, 1994 [DE] Germany ............... 44 41 876.0

[51] Int. Cl.$^6$ .................... F16H 59/06; F16H 59/36; B60K 41/16
[52] U.S. Cl. .................................................. 477/46
[58] Field of Search ................................. 477/46, 48

[56] References Cited

U.S. PATENT DOCUMENTS

| | | | |
|---|---|---|---|
| 4,747,325 | 5/1988 | Morimoto | 477/46 |
| 4,827,803 | 5/1989 | Miyawaki | 477/46 |
| 4,993,284 | 2/1991 | Oshiage | 477/46 |
| 4,999,774 | 3/1991 | Tokoro et al. | 477/46 |
| 5,009,129 | 4/1991 | Morimoto et al. | 477/46 |
| 5,050,455 | 9/1991 | Yamashita et al. | 477/46 |
| 5,319,999 | 6/1994 | Morishige et al. | 477/46 |

FOREIGN PATENT DOCUMENTS 4120540  11/1992  Germany.

*Primary Examiner*—Dirk Wright
*Attorney, Agent, or Firm*—Evenson, McKeown, Edwards & Lenahan P.L.L.C.

[57] ABSTRACT

The invention relates to a process for controlling a change of the transmission ratio (ue) in an infinitely variable transmission, which simulates a stepped transmission. A basic shifting time is determined separately for each shifting position and direction. In addition, a rotational speed factor, is used to take into account the change of the rotational input speed of the transmission caused by the change of the transmission ratio, and a lead factor reflects the lead existing at the transmission input. Shifting of the infinitely variable transmission is then performed as a function of the basic shifting time, the rotational speed factor and the lead factor.

6 Claims, 3 Drawing Sheets

PROCESS FOR DETERMINING THE SHIFTING TIME FOR A TRANSMISSION RATIO CHANGE IN AN INFINITELY VARIABLE TRANSMISSION

BACKGROUND AND SUMMARY OF THE INVENTION

This invention relates to a process for determining the shifting time for a transmission ratio change in an infinitely variable transmission which simulates the operation of a stepped transmission.

German Patent Document DE 41 20 540 C1, discloses an arrangement for controlling an infinitely variable transmission in such a manner that a stepped transmission is simulated which can be influenced directly by the driver. For this purpose, a control unit adjusts the pressure conditions on the infinitely variable transmission such that a desired transmission ratio $ue_{des}$ determined in the control unit as a function of the driver's shifting desire, is adjusted at the transmission. A change of the desired transmission ratio demanded in this manner cannot take place abruptly. Rather, it is carried out during a preset shifting time, taking into account the loading of the transmission, in order to generate a shifting comfort which is convenient for the driver.

As a rule, automatically shifted stepped transmissions used in passenger cars are constructed of gear wheels arranged to form planetary gear trains. By means of such gear trains preset transmission ratios can be shifted by clutches and brakes acted upon by pressure. In such transmissions, it is also important that the change of the transmission ratio (that is the pressure reduction in the case of the clutches and brakes operated at the old transmission ratio, on the one hand, and the pressure buildup in the case of the clutches and brakes operated in the future gear, on the other hand) not take place abruptly; rather, for both technical and comfort related reasons, it must be carried out during a preset shifting time.

One objection of the present invention is to provide a method and apparatus for determining such a shifting time in such a manner that the shifting comfort is adapted to a driver's feeling of comfort.

This object is achieved according to the invention by taking into account all variables which have a significant influence on a change of the transmission ratio. In particular, the position of the shifting (starting transmission ratio and target transmission ratio; for example, shifting from the 4th transmission ratio to the 5th transmission ratio) as well as the direction of the shifting (shifting from the 4th transmission ratio to the 5th transmission ratio as opposed to the shifting from the 5th transmission ratio to the 4th transmission ratio) have a significant influence on the shifting comfort. This influence is taken into account in that a basic shifting time is determined separately for every shifting and for every shifting direction.

According to the invention, a rotational speed factor is determined, which takes into account the change of the rotational input speed of the transmission caused by the change of the transmission ratio. Since this rotational speed change acts upon the rotating masses on the input side of the transmission as well as of a driving engine connected in front of the transmission, that portion of the influence on the shifting comfort which results from the change of the rotational energy of these masses is taken into account. With an increase of the rotational input speed, the rotational speed factor, and thus also the shifting time, will increase.

In addition, a load factor is determined, which takes into account the load applied to the transmission input. In the case of low loads, a soft, less noticeable shifting operation is desirable, which must meet high requirements for shifting comfort. In contrast, in the case of a high load, the desire to accelerate is a primary concern, which can also be met by utilizing the rotational energy. In the latter case the desire for comfort will not be as important, so that hard shiftinq is also acceptable. For this reason, when the load decreases, the load factor (and thus the shifting time) will increase. According to the layout, it is possible that, in the case of very high loads, the load factor reaches negative values in order to counteract the rotational speed factor for utilizing the rotational energy.

The application of the process can be achieved in a particularly simple and cost effective manner in the form of a programmable control, using a digital data processor.

According to a further embodiment of the invention, the basic shifting time is determined also as a function of the driving condition (drive or coasting). As a result, it is taken into account that the shifting comfort for a driver is influenced not only by the amount and the course of a shifting jolt, but also by its direction. This further development recognizes that a shifting jolt during coasting is felt to be more bothersome than a shifting jolt in drive. (This is caused by the fact that the driver is better supported by his seat in the drive operation than in the coasting operation.) On the other hand, during an acceleration a shifting jolt is accepted as necessary for the acceleration, or even as a sign of a sporty driving style, whereas, in the case of a deceleration during coasting, shifting jolts cause the impression of an interruption of the deceleration and are therefore felt to be bothersome.

Other objects, advantages and novel features of the present invention will become apparent from the following detailed description of the invention when considered in conjunction with the accompanying drawings.

DETAILED DESCRIPTION OF THE DRAWINGS

Figure 1:
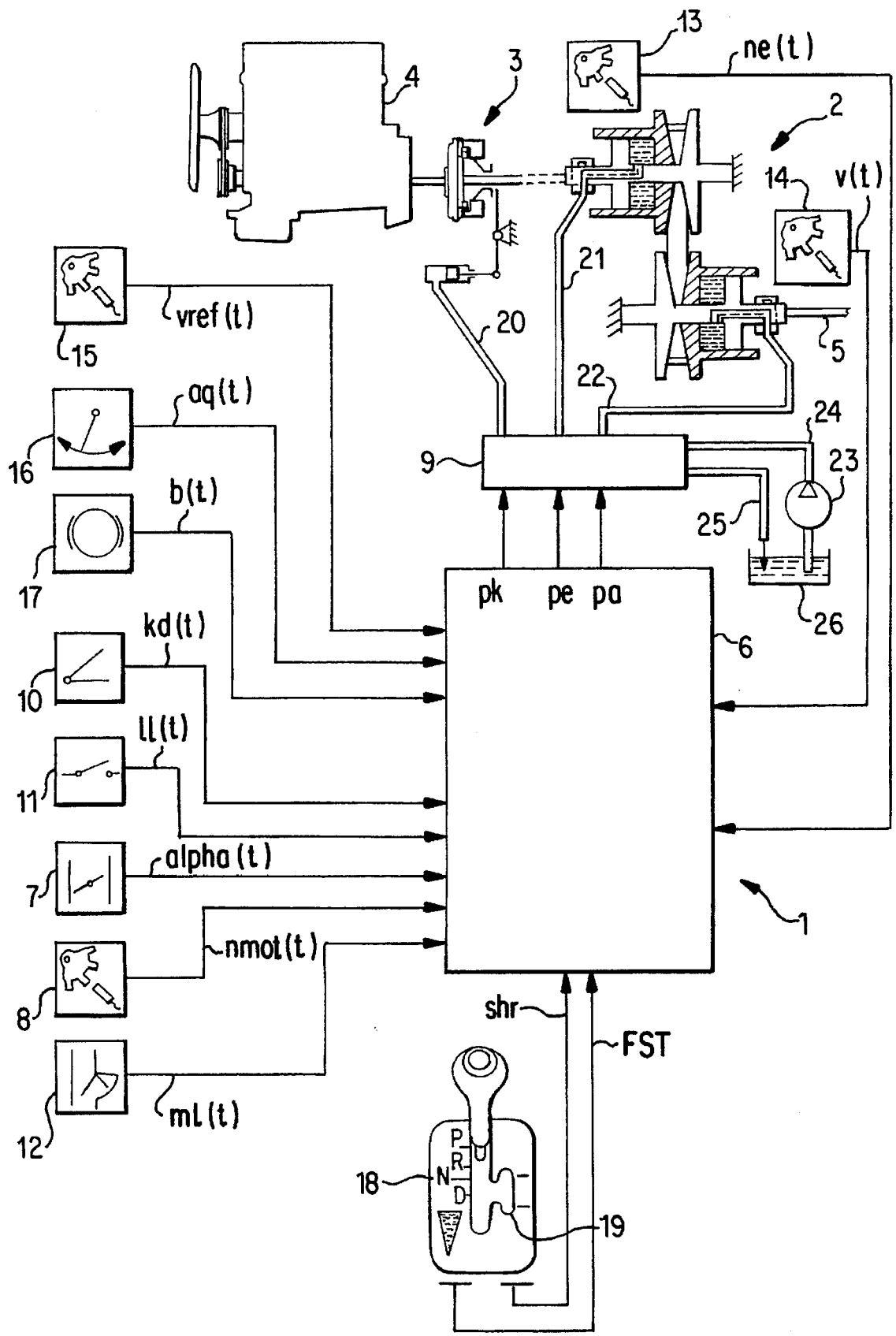
FIG. 1 is a schematic block diagram which shows an overview of an infinitely variable transmission with a control system according to the invention.

FIG. 1 is a block diagram of a control system 1 of an electrohydraulically operated infinitely variable transmission 2, for example, in a wind-around transmission. By means of a controllable starting clutch 3, the infinitely variable transmission 2 is driven by an internal-combustion engine 4. An output shaft 5 of the infinitely variable transmission 2 is connected which a drive wheel of a motor vehicle (not shown).

Variables and functions, which change with the time t, are illustrated in the following as functions f(t) of time t (for example, alpha(t) in FIG. 1.

A control unit 6 controls a hydraulic valve block 9 as a function of at least the throttle valve position alpha(t) of a throttle valve angle generator 7 and a rotational engine speed nmot(t) of a rotational engine speed generator 8 of the internal-combustion engine 4. To controlling the infinitely variable transmission 2 and the starting clutch 3, the control unit 6 receives, as additional input variables, a kick-down signal kd(t) of a kick-down switch 10, an idling signal 11(t)

of an idling switch 11, an air quantity or air mass ml(t) of an air quantity or air mass generator 12 of the internal-combustion engine 4, as well as a transmission rotational input speed ne(t) of a transmission rotational input speed generator 13 and a driving speed v(t) of a driving speed generator 14. In addition, the control unit 6 detects and processes a speed vref(t) of a reference speed generator 15 on a nonpowered vehicle axle, a lateral acceleration aq(t) of a lateral acceleration generator 16 and a brake signal b(t) of a brake signal generator 17.

Finally, the control can normally be influenced by the vehicle driver by way of a selecting device 18 for preselecting the driving positions P (parking position), R (reverse gear position), N (idling gear position) and D (automatic adjusting of the transmission ratio etc. of the infinitely variable transmission). In addition, an adjusting range of the selecting device 18 is provided for directly defining the transmission ratio, etc.

The selecting device 18 can be moved from driving position D into a second shifting channel 19 in which it operates as a rocker switch by which the vehicle driver can influence the transmission ratio in the sense of an upshifting or downshifting. The selecting device 18 emits a driving position signal FST and a shifting requirement signal shr for an upshifting or a downshifting.

Here and in the following, the term "upshifting" or "reducing the transmission ratio" indicates a transmission ratio change which, for given rotational input speed, increases the rotational output speed of the transmission, corresponding to an upshifting in the case of a stepped transmission. Inversely, the terms "downshifting" and "increasing the transmission ratio" indicate a transmission ratio change in the sense of a reduction of the rotational output speed of the transmission while the rotational input speed remains the same, corresponding to a downshifting in the case of a stepped transmission.

As a function of the mentioned variables, the control unit 6 controls the hydraulic pressure in the starting clutch 3 in a conventional manner by way of a signal output pk and the valve block 9 as well as a transmission ratio ue between the transmission rotational input speed ne(t) and the transmission rotational output speed (driving speed) v(t) by way of signal outputs pe and pa and the hydraulic valve block 9. For this purpose, the hydraulic valve block 9 connects corresponding control lines 20, 21 and 22 of the starting clutch 3 and of the infinitely variable transmission 2 with a pressure line 24 connected to a pump 23 or with a return flow line 25 to a storage tank 26 for hydraulic fluid.

Figure 2:
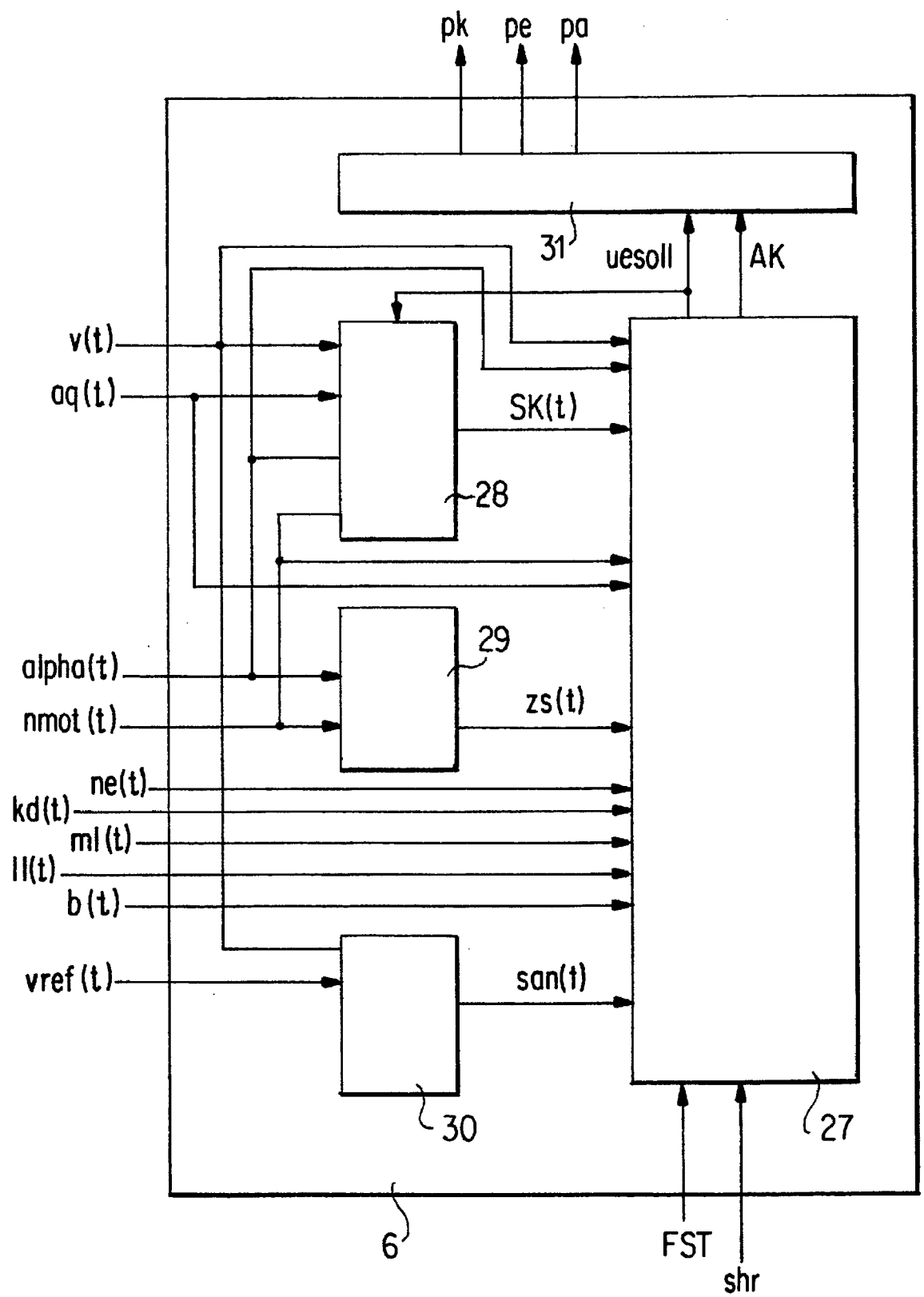
FIG. 2 is a schematic block diagram of a transmission ratio control system.

As illustrated in FIG. 2, the control unit 6 comprises a transmission ratio control system 27 which is connected with a driving activity determining function 28, a drive/coasting determining function 29, a wheel slip determining function 30 and an adjusting function 31.

The driving activity determining function 28 determines a driving activity variable SK(t) which evaluates the driver's driving style or his traffic-situation-dependent action with respect to the control of the motor vehicle in a known manner, and preferably according to a process described in German Patent Document DE-OS 39 22 051.

Depending on the throttle valve position alpha(t) and the rotational engine speed nmot(t), the drive/coasting determining function 29 emits a signal indicative of drive or coasting operation of the vehicle zs(t), and the wheel slip determining function 30 determines a wheel slip san(t), representing the slip of the driven wheels, from the difference of the driving speed v(t) and the speed vref(t).

From these variables, as well as the driving position signal FST, the shifting requirement signal shr, the throttle valve position alpha (t), the kick-down signal kd(t), the idling signal 11(t), the air mass mt(t), the transmission rotational input speed ne(t), the driving speed v(t), the lateral acceleration aq(t), the braking signal b(t) and the transmission rotational output speed ne(t), the transmission ratio control system 27 determines a desired transmission ratio $ue_{des}$ as well as a driving clutch open/shut signal AK which are transmitted to the adjusting function 31.

By means of the signal outputs pe and pa, the adjusting function 31 controls adjustment of the transmission ratio ue of the transmission 2, with the desired transmission ratio $ue_{des}$ being adjusted with the shortest possible time delay, but without any noticeable overshooting. Furthermore, the starting clutch is controlled according to the starting clutch open/shut signal AK by the adjusting function 31 by way of the signal output pk.

The transmission ratio control system 27 determines in a first method of operation, which automatically selects the transmission ratio, the desired transmission ration $ue_{des}$ from the input variables drive/coasting zs(t), wheel slip san(t), driving position signal FST, driving activity SK(t), throttle valve position alpha(t), rotational engine speed nmot(t), idling signal 11(t), kick-down signal kd(t), air mass signal ml(t), braking-signal b(t) and transmission rotational input speed ne(t).

In a second method of operation influenced by the driver, a stepped transmission is simulated which can be influenced directly by the driver. The desired transmission ration $ue_{des}$ is determined from the input variables shifting requirement signal shr, transmission rotational input speed ne(t), throttle valve position alpha(t) and drive/coasting zs(t).

The transmission ratio control 27 contains a table (not shown) in which preset desired transmission ratios $ue_{des\_i}$ are filed. Since, when a stepped transmission is simulated, each of these preset desired transmission ratios $ue_{des\_i}$ corresponds to a gear of this stepped transmission, as many preset desired transmission ratios $ue_{des\_i}$ are provided as gears of a stepped transmission are to be simulated. The preset desired transmission ratios $ue_{des\_i}$ may therefore also be called gears.

In the illustrated example, a 5-gear stepped transmission is simulated so that, for forward driving, the preset desired transmission ratios $ue_{des\_1}$, $ue_{des\_2}$, $ue_{des\_3}$, $ue_{des\_4}$ and $ue_{des\_5}$ are stored in the table. The designation $ue_{des\_i}$ of the preset desired transmission ratios accords with the $ue_{des\_i}$ pattern, in which i indicates the corresponding gear of the stepped transmission. $ue_{des\_3}$ therefore indicates the preset desired transmission ratio which corresponds to the 3rd gear of the stepped transmission. (As noted previously, while the gears become "higher" from $ue_{des\_1}$ to $ue_{des\_5}$, the value of the preset desired transmission ratio is reduced in this direction: the preset desired transmission ratio is the highest at $ue_{des\_1}$ and the lowest at $ue_{des\_5}$.)

In order to initiate from a shifting requirement signal shr a change of the transmission ratio ue, the following steps are required:

determining a shifting time ts, determining a characteristic transition curve.

By means of the shifting time ts and the characteristic transition curve, the course of the desired transmission ratio $ue_{des}$ is then determined from the old value, for example, $ue_{des\_4}$, to the new value, for example, $ue_{des\_5}$.

The shifting time ts is determined according to $$ts = tg(gg) * (1 + DF + LF)$$ (Equation 1)

with a rotational speed factor DF $$DF = A(gg) * \frac{\Delta n}{\Delta n\_max * 100}$$ (Equation 2)

and a load fact LF $$LF = B(gg) * \frac{Md}{Md\_max * 100}$$ (Equation 3)

consisting of the following variables:

gg: type of shifting described by the shifting and the shifting direction. Example: 12_z means shifting from the first transmission ratio $ue_{des}\_1$ into the second transmission ratio $ue_{des}\_2$ during drive; 43_s means shifting from the fourth transmission ratio $ue_{des}\_4$ into the third desired transmission ratio $ue_{des}\_3$ during coasting.

tg(gg): basic shifting time for the shifting type gg.

A (gg): rotational speed coefficient for the shifting type gg.

B (gg): load coefficient for the shifting type gg.

Delta_n: precalculated change of the transmission rotational input speed ne(t) during the change of the transmission ratio as a function of the shifting and of the transmission rotational input speed net(t).

Delta_n_max: maximally possible change of the transmission rotational input speed he(t) in the case of the intended change of the transmission ratio.

Md: input torque of the transmission 2.

Md_max: maximal input torque of the transmission 2.

Figure 3:
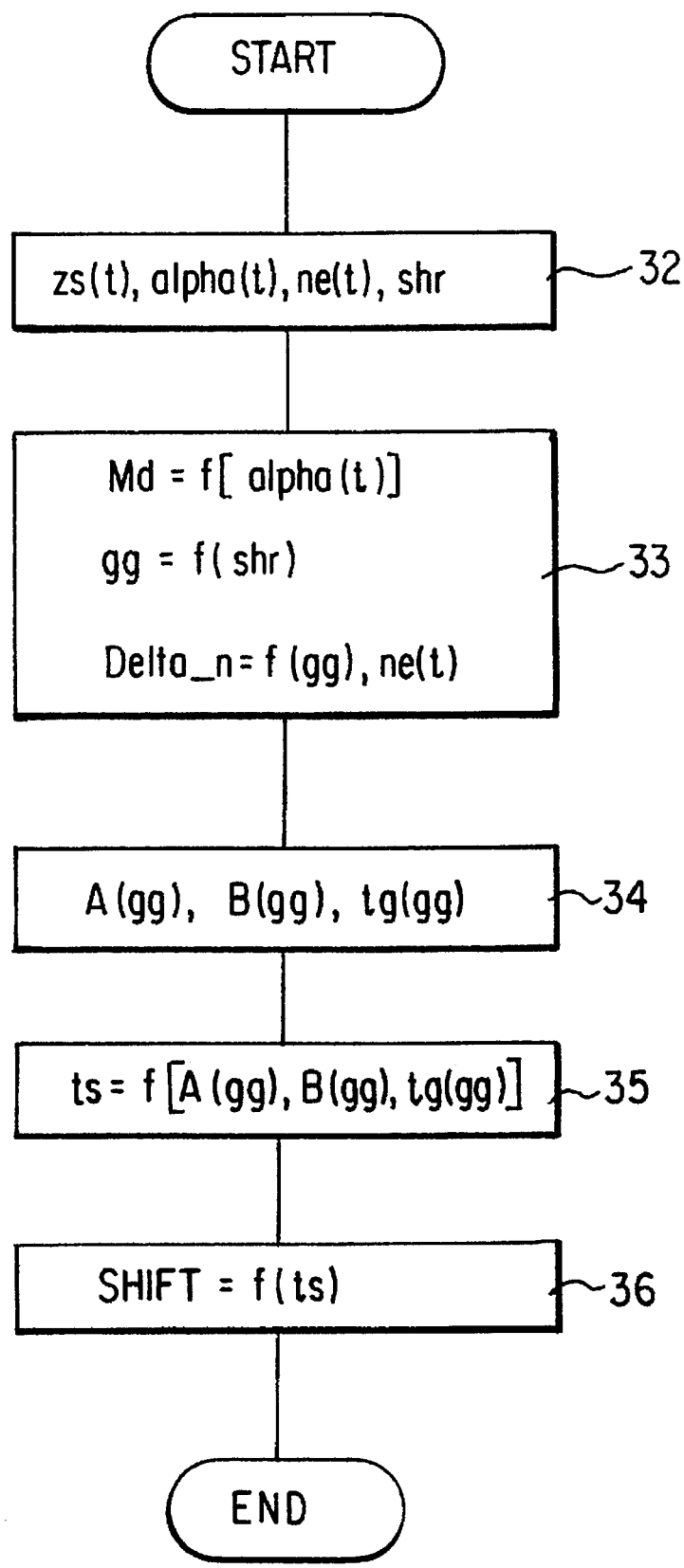
FIG. 3 is a flow chart for the determination of a shifting time according to the invention.

Before calculation of the shifting time ts, the above-mentioned variables must first be determined. The steps required for this purpose are illustrated in FIG. 3 in the form of a flow chart. In step 32, the primary input variables drive/coasting zs(t), throttle valve position alpha(t), transmission rotational input speed ne(t) and shifting requirement signal shr are determined. In the next step 33, the input torque Md is determined as a function of the throttle valve position alpha(t); the shifting type gg is determined from the presently adjusted transmission ratio ue and the shifting requirement signal shr; and the change of the transmission rotational input speed Delta_n is determined from the shifting type gg and the transmission rotational input speed net(t). In step 34, by means of the latter secondary input variables, the basic shifting time tg(gg), the rotational speed coefficient A(gg) and the load coefficient B(gg) are determined from look up tables. Thereafter, the shifting time ts is calculated in step 35 according to equation 1.

By means of the previously determined values for the old desired transmission ratio $ue_{des}\_1$, the new desired transmission ratio $ue_{des}\_2$, the shifting time ts, and a characteristic transition curve, in step 36 the time sequence of the desired transmission ratio $ue_{des}$ is then determined and adjusted on the transmission 2 by way of the adjusting function 31 and the valve block 9.

The process described in the above-mentioned embodiment is preferably implemented in the form of a program in a programmable control system provided with a microcomputer. The program may perform the correlation of two variables (for example, the assignment of the throttle valve position alpha(t) to an input torque Md(t)) by means of look up tables or by a functional relationship.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for controlling a change of the transmission ratio in an infinitely variable transmission which simulates a stepped transmission, said process comprising the steps of:

determining a basic shifting time as a function of position and direction of a change of the transmission ratio;

determining a rotational speed factor as a function of a change of input torque of the transmission in changing the transmission ratio;

determining a load factor as a function of a load signal of the transmission;

determining a shifting time from the basic shifting time, the load factor and the rotational speed factor; and controlling shifting of said transmission as a function of said shifting time.

2. Process according to claim 1, wherein the basic shifting time is determined also as a function of driving condition of said vehicle.

3. Process according to claim 2, wherein the basic shifting time is smaller in the case of a drive condition than in the case of a coasting condition.

4. Apparatus for controlling a change of the transmission ratio in an infinitely variable transmission which simulates a stepped transmission comprising:

means for determining a basic shifting time as a function of position and direction of a change of the transmission ratio;

means for determining a rotational speed factor as a function of a change of input torque of the transmission in changing the transmission ratio;

means for determining a load factor as a function of a load signal of the transmission;

means for determining a shifting time from the basic shifting time, the load factor and the rotational speed factor; and means controlling shifting of said transmission as a function of said shifting time;

wherein each of said means comprises a programmable data processor.

5. Apparatus according to claim 4, wherein said data processor comprises look up tables for determining variables for controlling said transmission.

6. Apparatus according to claim 4, wherein said data processor comprises functional relationships for calculating variables for controlling said transmission.

\* \* \* \* \*